United States Patent [19]

von Benda et al.

[11] Patent Number: 4,892,793
[45] Date of Patent: Jan. 9, 1990

[54] NICKEL-CADMIUM CELL APPARATUS

[75] Inventors: Klaus von Benda, Nürtingen; Gábor Benczûr-Ürmössy, Stuttgart; Gerhard Berger, Deizisau; Rainer Klink, Kernen; Uwe Gierz, Plochingen, all of Fed. Rep. of Germany

[73] Assignee: Deutsche Automobilgesellshaft mbH, Hanover, Fed. Rep. of Germany

[21] Appl. No.: 207,501

[22] Filed: Jun. 16, 1988

[30] Foreign Application Priority Data

Jun. 16, 1987 [DE] Fed. Rep. of Germany ....... 3720072

[51] Int. Cl.$^4$ ........................................... H01M 10/34
[52] U.S. Cl. ....................................... 429/60; 429/57
[58] Field of Search ................. 429/57, 58, 59, 222, 429/223, 162, 60

[56] References Cited

U.S. PATENT DOCUMENTS

| 2,862,986 | 12/1958 | Strauss | 429/60 |
|---|---|---|---|
| 3,022,363 | 2/1962 | Grieger | 429/222 |
| 3,174,879 | 3/1965 | Stanimirovitch | 429/222 |
| 3,318,733 | 5/1967 | Stanimirovitch | 429/60 |
| 3,393,094 | 7/1968 | Stanimirovitch | 429/60 |
| 4,070,528 | 1/1978 | Bergum et al. | 429/162 |

FOREIGN PATENT DOCUMENTS 2907262 4/1980 Fed. Rep. of Germany .

Primary Examiner—Donald L. Walton
Attorney, Agent, or Firm—Barnes & Thornburg

[57] ABSTRACT

A gas tightly sealed nickel-cadmium cell is provided which works on the oxygen cycle principle and has a charge and discharge reserve at the negative electrode. Further, the partial pressure of the gases which cannot be reacted in the cell is below 0.4 bar. As a result of this substantial removal of the gases which cannot be reacted from the interior space of the cell, there is a considerable rise in the oxygen consumption rate, i.e., the rate at which the oxygen generated in the cell is reacted at the negative electrode, so that higher charge current densities are possible.

7 Claims, 1 Drawing Sheet

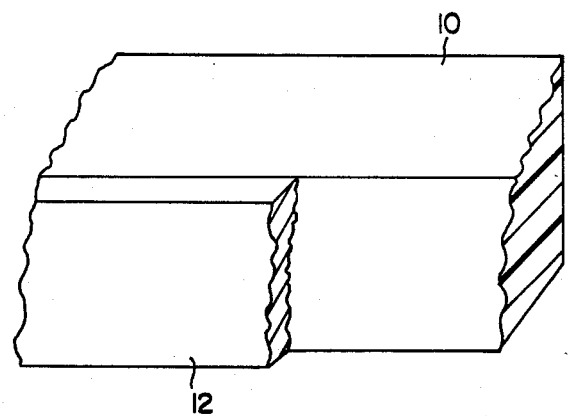

NICKEL-CADMIUM CELL APPARATUS

BACKGROUND AND SUMMARY OF THE INVENTION

The invention relates to substantially hermetically sealed nickel-cadmium cells which work on the oxygen cycle principle, and which have a charge and discharge reserve at the negative electrode and have a diffusion body at the side of the negative electrode facing away from the positive electrode.

Substantially gas tight nickel-cadmium cells usually work on the oxygen cycle principle, i.e., the positive capacity oi so designed that the positive electrode is completely charged. This avoids a generation of hydrogen at the negative electrode. The oxygen is reduced at the negative electrode so that, even with continued charging, the negative is never fully charged and there is, therefore, no risk of hydrogen generation. The oxygen is, however, usually slowly reacted so that, depending on charge current level and overcharging state, an oxygen partial pressure of a few bar prevails towards the end of charging. Since the cell is filled with air during construction, the interior space contains the non-reactible constituents of air, in addition to the quantity of oxygen which varies considerably in periodic cycles. In particular, some non-reactible constituents include nitrogen and small quantities of hydrogen, as well as water vapor from the electrolyte.

Although it is known that after a certain service life or after complete discharge (*Varta Fachbuchreihe*, Vol. 9, "Gas Tight Nickel-Cadmium Accumulators", 1978, p. 74), or under certain conditions with charging lasting for days (German Published Examined Patent Application No. 1,127,418), the oxygen in the cell may be reacted to such an extent that a slight underpressure prevails in the cell. Thus, the use of an over-pressure-resistant housing for such cells has hitherto been unavoidable. The cells therefore have a metallic housing in cylindrical or prismatic form which is capable of withstanding the internal pressure without substantial deformation.

However, German Patent Application No. 2,742,869 shows a substantially gas tight nickel-cadmium cell which has a prismatic, shallow plastic housing. The bulging of the housing as a result of the overpressure occurring towards the end of charging is counteracted by means of a continuous central housing plug which holds the base and lids together.

It is furthermore known that, as a result of the incorporation of special gas diffusion bodies which are arranged on the side of the negative electrode facing away from the positive electrode, the oxygen produced during charging or overcharging can be fed systematically to the negative electrode and reacts there particularly rapidly (for example, German Unexamined Patent Application No. 2,907,262). However, in this arrangement, the rate of reaction of oxygen (oxygen consumption rate) at the negative electrode is still so slow that an overpressure-resistant housing continues to be necessary.

An object of the present invention is to provide a nickel-cadmium cell which works on the oxygen cycle principle as discussed above in which the oxygen consumption rate is so high that overpressure is no longer formed in the cell, and the latter can be constructed with a particularly light housing.

These objects and other objects are achieved by providing a hermetically sealed nickel-cadmium cell apparatus which works on the oxygen cycle principle and has a charge and discharge reserve at the negative electrode. Any gases which cannot be reacted in the cell have a partial pressure below 0.4 bar.

Surprisingly, the present invention has shown that an overpressure no longer builds up in the cell, if the partial pressure of the gases which cannot be reacted in the cell is below 0.4 bar. The removal of the non-reactible gases, in particular, nitrogen, from the gas space of the cell, results in a very considerable increase in the oxygen consumption rate. As a result, oxygen pressure is reduced by a factor of 3 to 4 compared with a conventional cell for the same charge current level and the same charge condition. This applies even at high charging rates of up to 2 $C_N A$ (current in A of double the nominal capacity in Ah).

The lower the partial pressure is of the gases which cannot be reacted in the cell, the better is the oxygen consumption rate. As soon as the partial pressure of the gases which cannot be reacted in the cell rises above 0.4 bar, the behavior of the cell increasingly approximates a conventional cell. According to advantageous features of a particularly preferred embodiment, the partial pressure of the gases which cannot be reacted in the cell is below 0.1 bar.

These non-reactive gases can be removed before the final sealing of the cell. According to certain preferred embodiments, these gases are removed by thoroughly flushing with oxygen, for example. However, in particularly preferred embodiments, the removal of these non-reactive gases is achieved by evacuation of the cell by means of a vacuum pump. It was discovered that if partial pressures of less than 0.4 bar are maintained, an overpressure does not occur in any operating state of the cell, even with high charging currents. Such cells can therefore be given plastic housings, preferably in the prismatic or shallow construction, without any particular further pressure-resistant measures. The external atmospheric pressure forces the assembly of plates together via the plastic housing and ensures a good hydraulic contact. The essential technical advantages of such cells are: the lack of risk of explosions with serious consequences in the event of incorrect use or incorrect operation in mines or in manned space travel, a saving in weight compared with metal housings, a very simple manufacture of the housing by injection molding processes and a simple insulation of the terminal lead throughs.

Other objects, advantages and novel features of the present invention will become apparent from the following detailed description of the invention when considered in conjunction with the accompanying drawings.

BRIEF DESCRIPTION OF THE DRAWING FIGURE

The single drawing figure is a schematic view of a section of the housing wall of the cell according to certain preferred embodiments of the invention.

DETAILED DESCRIPTION OF THE DRAWING FIGURE

The gas tight housing 10 can be made of plastic and is provided with a layer 12 which inhibits the diffusion of nitrogen, on at least 85% of its surface. Suitable plastic materials for the housing are, in particular, polyolefins and polyamides. However, any plastics can be used provided they are inert towards the alkaline electrolytes. It was discovered that the coating with a layer which inhibits the diffusion of nitrogen is necessary, since the plastics have a relatively high permeability for gases, in particular for atmospheric nitrogen. The driving force for this permeation is increased by the underpressure which in general prevails in the cell. Without the coating which inhibits the diffusion of nitrogen, a long term increase in pressure occurs in the cell, and the advantages mentioned, such as high oxygen consumption rate or the forcing together of the plate assembly by the external atmospheric pressure are lost.

It was found that it is often not necessary to coat the entire housing surface. On the contrary, in the case of thick-walled housing parts, in particular, such as the lid and base, a coating can be dispensed with or the coating can be applied only partially. However, in order to suppress the diffusion of nitrogen into the cell even in the long term, the coating should cover at least 85% of the surface of the housing.

According to certain preferred embodiments, the layer which inhibits diffusion is preferably composed of metal. It is comtemplated that the layer be produced by vapor coating the housing or by the decomposition of gaseous metal compounds in vacuum or by electrochemical metallization of the housing. According to certain preferred embodiments, the electrochemically produced metal layer is reinforced further by electroplating. However, in particularly preferred embodiments, the metal layer is composed of a stuck-on metal foil. For this purpose, metal foils are advantageously used which are provided with a contact adhesive layer and can therefore be very simply applied to the housing surface.

Suitable metals for the metallic coating are, for example, aluminum, steel, zinc, nickel, copper etc. The metal layer should be at least 15 $\mu$m thick since it is difficult to manufacture thinner layers without fairly high porosity. Further, excessively thick layers are expensive and heavy, and thus, for optimum operating conditions, a layer thickness range of about 20 $\mu$m to 70 $\mu$m is suitable.

According to certain preferred embodiments, an organic coating, in particular a lacquer coating composed of a suitable material, is used as the diffusion-inhibiting layer. Particularly suitable is a layer composed of polyvinylidene chloride or fluoride which is at least 50 $\mu$m thick.

It is also contemplated that the layer which inhibits the diffusion may additionally be provided with a protective lacquer or plastic layer which increases the abrasion resistance, and if the diffusion-inhibiting layer is composed of metal, improves the corrosion resistance and makes possible an insulation of the cell housing in the battery unit. In the case of very thin metal layers which may still have a certain porosity, very particularly good results are achieved if a protective lacquer layer is also provided to prevent the diffusion of gases. The lacquer layer is composed of polyvinylidene chloride or fluoride, for example. As a result of the coating, the additional advantage is achieved that the permeation of water vapor through the housing material composed of plastic is considerably restricted, as a result of which the quantity of electrolyte in the cell remains substantially constant even under extreme climatic conditions.

The following example is offered by way of illustration only and should not be construed as limiting the scope of the invention in any way.

EXAMPLE

Two prismatic substantially gas tight nickel-cadmium cells were constructed with a nominal capacity (5-hour) of 19 ampere-hours according to the teaching of German Unexamined Patent Application No. 2,907,262, including metallic gas diffusion bodies at the rear sides of the negative electrodes. The cells had a 2 mm thick polypropylene housing. A self-adhesive 50 $\mu$m thick aluminum foil was glued onto the outer surface of one of these cells. The aluminum foil covered 86% of the surface of the housing. The other cell was left untreated. Before being sealed, both cells were evacuated with a vacuum pump to 0.01 bar residual pressure. An electrical pressure sensor on the cell made it possible to track the variation in pressure during cyclization (charging and discharging) of the cells.

With a charging current of 17 ampere and a charging factor of 1.2 relative to the previous discharge (exhausting discharge) a periodically repeating pressure play (pressure variation) of $p=0.3$ bar was measured.

After a running period of 6 months, the pressure variations in the uncoated cell were already 0.7 bar and the cell had a residual pressure of 0.5 bar in the discharged cell. This residual gas atmosphere consisted of nitrogen which got into the cell by permeation through the housing wall. The capacity of the uncoated cell was dropping and the walls bulged slightly outwards at the end of charging as a consequence of the internal pressure produced of 1.2 bar (residual pressure 0.5 bar+-pressure play 0.7 bar).

Conversely, the cell coated with aluminum foil exhibited virtually no change in it properties.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Sealed nickel-cadmium cell apparatus which works on the oxygen cycle principle and which has a charge and discharge reserve at the negative electrode and has a gas diffusion body at the side of the negative electrode facing away from the positive electrode, comprising a hermetically sealed cell including oxygen and gases which cannot be reacted in the cell having a partial pressure, the partial pressure of the gases which cannot be reacted in the cell being below 0.4 bar and the hermetically sealed cell having a substantially gas tight plastic housing and a layer which inhibits the diffusion of nitrogen disposed on at least 85% of a surface of the housing.

2. Apparatus as in claim 1, wherein said layer which inhibits the diffusion of nitrogen includes metal.

3. Apparatus as in claim 2, wherein said metal layer comprises a glued-on foil.

4. Apparatus as in claim 2, wherein said metal layer includes a chemically produced metal layer.

5. Apparatus as in claim 4, wherein said chemically produced metal layer is reinforced by electroplating.

6. Apparatus as in claim 1, wherein said layer which inhibits the diffusion of nitrogen includes at least one of polyvinylidene chloride and polyvinylidene fluoride and is at least 50 $\mu$m thick.

7. Apparatus as in claim 1, wherein the partial pressure of said gases which cannot be reacted in said cell is below 0.1 bar.

* * * * *